US008533698B2

(12) United States Patent
Zhu et al.

(10) Patent No.: US 8,533,698 B2
(45) Date of Patent: Sep. 10, 2013

(54) OPTIMIZING EXECUTION OF KERNELS

(75) Inventors: Weirong Zhu, Issaquah, WA (US); Amit Kumar Agarwal, Bellevue, WA (US); Lingli Zhang, Sammamish, WA (US); Yosseff Levanoni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 269 days.

(21) Appl. No.: 13/158,966

(22) Filed: Jun. 13, 2011

(65) Prior Publication Data
US 2012/0317556 A1    Dec. 13, 2012

(51) Int. Cl.
*G06F 9/44* (2006.01)
(52) U.S. Cl.
USPC ............ 717/151; 717/135; 717/140; 717/146; 717/149; 717/150
(58) Field of Classification Search
None
See application file for complete search history.

(56) References Cited

U.S. PATENT DOCUMENTS

| 7,082,600 | B1 | 7/2006 | Rau |
| 7,694,290 | B2 * | 4/2010 | Liu et al. ........................ 717/151 |
| 7,814,486 | B2 | 10/2010 | Papakipos |
| 8,087,010 | B2 * | 12/2011 | Eichenberger et al. ........ 717/150 |
| 8,087,011 | B2 * | 12/2011 | Eichenberger et al. ........ 717/151 |
| 8,136,102 | B2 * | 3/2012 | Papakipos et al. ............. 717/140 |
| 8,136,104 | B2 * | 3/2012 | Papakipos et al. ............. 717/146 |
| 8,146,066 | B2 * | 3/2012 | Demetriou et al. ............ 717/149 |
| 2003/0014743 | A1 | 1/2003 | Cooke et al. |
| 2003/0149962 | A1 * | 8/2003 | Willis et al. ................... 717/135 |
| 2007/0136730 | A1 | 6/2007 | Wilt |
| 2008/0276262 | A1 | 11/2008 | Munshi et al. |
| 2009/0019431 | A1 * | 1/2009 | George et al. ................. 717/151 |
| 2010/0125835 | A1 | 5/2010 | Kandasamy et al. |
| 2010/0153934 | A1 * | 6/2010 | Lachner ........................ 717/146 |

FOREIGN PATENT DOCUMENTS

WO    2011053303    5/2011

OTHER PUBLICATIONS

Varnagiryte et. al, "A practical approach to DSP code optimization using compiler/architecture", 2002, Kaunas University of Technology, pp. 1-6, <http://www.ebiblioteka.lt/resursai/Mokslai/KTU/Ultragarsas/PDF%20straipsniai%2043-2002-Vol.2/43-2002-Vol.2_05-B.Varnagiryte.pdf>.*
John A. Stratton, "MCUDA: An Efficient Implementation of CUDA Kernels for Multi-core CPUs", 2008, University of Illinois, pp. 16-30, <http://link.springer.com/content/pdf/10.1007%2F978-3-540-89740-8_2.pdf>.*
Xiaoguang Ren, "Optimization and Implementation of LBM benchmark on Multithreaded GPU", 2010, National University of Defense Technology Changsha, China, pp. 116-122, <http://ieeexplore.ieee.org/stamp/stamp.jsp?tp=&arnumber=5452598>.*

(Continued)

*Primary Examiner* — Thuy Dao
*Assistant Examiner* — Khanh Dang
(74) *Attorney, Agent, or Firm* — Workman Nydegger

(57) ABSTRACT

The present invention extends to methods, systems, and computer program products for optimizing execution of kernels. Embodiments of the invention include an optimization framework for optimizing runtime execution of kernels. During compilation, information about the execution properties of a kernel are identified and stored alongside the executable code for the kernel. At runtime, calling contexts access the information. The calling contexts interpret the information and optimize kernel execution based on the interpretation.

20 Claims, 4 Drawing Sheets

(56) References Cited

OTHER PUBLICATIONS

Subramanian Rajagopalan, "A retargetable VLIW compiler framework for DSPs with instruction-level parallelism", 2001, IEEE, pp. 1319-1328, <http://ieeexplore.ieee.org/stamp/stamp.jsp?tp=&arnumber=959861>.*

Fraser, Stuart, "Investigation Into Hardware Acceleration of HPC, Kernels, Within a Cross Platform OpenCL Environment", Aug. 2010, 61 pages.

Leslie, Rebekah, et al., "Formalizing Information Flow in a Haskell Hypervisor", 2007, 6 pages.

Wang, Zhi, et al., "Countering Persistent Kernel Rootkits Through Systematic Hook Discovery", Based on information and belief available, at least as early as Jan. 24, 2011, 18 pages.

Maestre, Rafael, et al, "A Framework for Reconfigurable Computing: Task Scheduling and Context Management", IEEE Transactions on Very Large Scale Integration (VLSI) Systems, vol. 9, No. 6, Dec. 2001, pp. 858-873.

Power, Russell, et al., "Piccolo" Builidng Fast, Distributed Programs with Partitioned Tables, at least as early as Jan. 24, 2011, 14 pages.

Bond, Michael D., "Breadcrumbs: Efficient Context Sensitivity for Dynamic Bug Detection Analyses", PLDI'10, Jun. 5-10, 2010, Toronto, Ontario, Canada, 12 pages.

\* cited by examiner

US 8,533,698 B2

OPTIMIZING EXECUTION OF KERNELS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some environments, execution of a program is split between multiple processors within the same computer system. For example, some computer systems have multiple Central Processing Units ("CPUs"). During program execution, two or more of the CPUs can execute part of a program. Further, many computer systems also include other types of processors, some with relatively significant processing capabilities. For example, many computer systems include one or more Graphics Processing Units ("GPUs"). Some combinations of compilers are capable of compiling source code into executable code (e.g., C++ to Intermediate Representation ("IR") to High Level Share Language ("HLSL") bytecode) that executes in part on a CPU and executes in part on a GPU. Some types of instructions may even be better suited for execution on a GPU. Thus, source code can be specifically developed for mixed execution on one or more CPUs and one or more GPUs.

In the domain of technical computing, it is typical that computational intensive kernels are accelerated by special hardware or networks. Typically the developer will demarcate boundaries of such a computationally intensive kernel (hereinafter referred to simply as a "kernel"). The boundaries indicate to a compiler when the code for the kernel is to be compiled in special ways such as, for example, to a different instruction set (that of the accelerator) or to set up a call-return sequence to and from the GPU In the construction of compilers that address compilation for mixed execution (whether it be for a GPU, an accelerator, etc), it is useful to have as part of the compilation process, information flow from the calling context into the called context (e.g., the kernel) (top-down information flow). It is also useful to have as part of the compilation process, information flow from the called context (e.g., the kernel) into calling context (bottom-up information flow). Bi-directional flow is typical in a compilation approach called "whole program optimization. However, whole program optimization is not always practical or reliable. Whole program optimization is not always practical because sometimes a compiler is not configured to flow information in one or more of the top-down or bottom-up directions. Whole program optimization is not always reliable since the flow of information can depend on heuristics.

BRIEF SUMMARY

The present invention extends to methods, systems, and computer program products for optimizing execution of kernels. In some embodiments, lower level code is generated so that kernel execution can be optimized at runtime. Program source code is accessed. The program source code includes an element that identifies part of the program source code as a kernel that is to be executed on a co-processor (e.g., a Graphical Processing Unit ("GPU") or other accelerator). The program source code also declares properties of the kernel.

The program source code is compiled into lower level code. The code element within the program source code is detected. In response to detecting the code element, the program source code is compiled into proxy code and into separate stub code. The proxy code is for execution in a context (e.g., on a central processing unit) that can invoke the stub code and the stub code is for execution on a co-processor.

Compilation of the source code includes generating the proxy code. The proxy code is configured to invoke the stub code in accordance with the declared properties of the kernel. The proxy code includes a descriptor for referencing any runtime optimization objects stored during compilation.

An intermediate representation of the stub code is analyzed to derive usage information about the declared properties of the kernel. The stub code is generated in accordance with the derived usage information. The derived usage information is stored in one or more runtime optimization objects alongside the stub code. The descriptor is linked to the one or more runtime optimization objects stored alongside the stub code to provide the proxy code with access to the derived usage information for making kernel optimization decisions at runtime.

In other embodiments, kernel execution is optimized at runtime. An execution command is received to execute lower level code. The lower level code includes proxy code for execution on a central processing unit, stub code for execution on co-processor, and one or more runtime optimization objects stored alongside the stub code. The one or more runtime optimization objects store derived usage information about the usage of kernel properties declared in program source code. The derived usage information was derived through analysis during generation of the stub code from program source code. The proxy code is configured to invoke the stub code in accordance with the declared kernel properties. The proxy code includes a descriptor linked to the one or more runtime optimization objects stored alongside the stub code.

In response to the execution command, the proxy code is executed on a central processing unit to invoke a call proxy. Execution of the proxy code includes using the descriptor to consult the derived usage information stored in the one or more runtime optimization objects. Execution of the proxy code includes making an optimization decision optimizing execution of the kernel based on the derived usage information. The optimization decision includes optimizing one or more of: invoking the stub code and passing data to the stub code. Execution of the proxy code includes invoking the stub code on a co-processor (e.g., a Graphical Processing Unit ("GPU") or other accelerator). Execution of the proxy code includes passing data to the stub code to dispatch the kernel on the co-processor.

The stub code is executed on the co-processor to invoke a call stub. Execution of the stub code includes receiving the data passed from the call proxy. Execution of the call stub includes dispatching the kernel on the co-processor in accordance with the formatted data.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
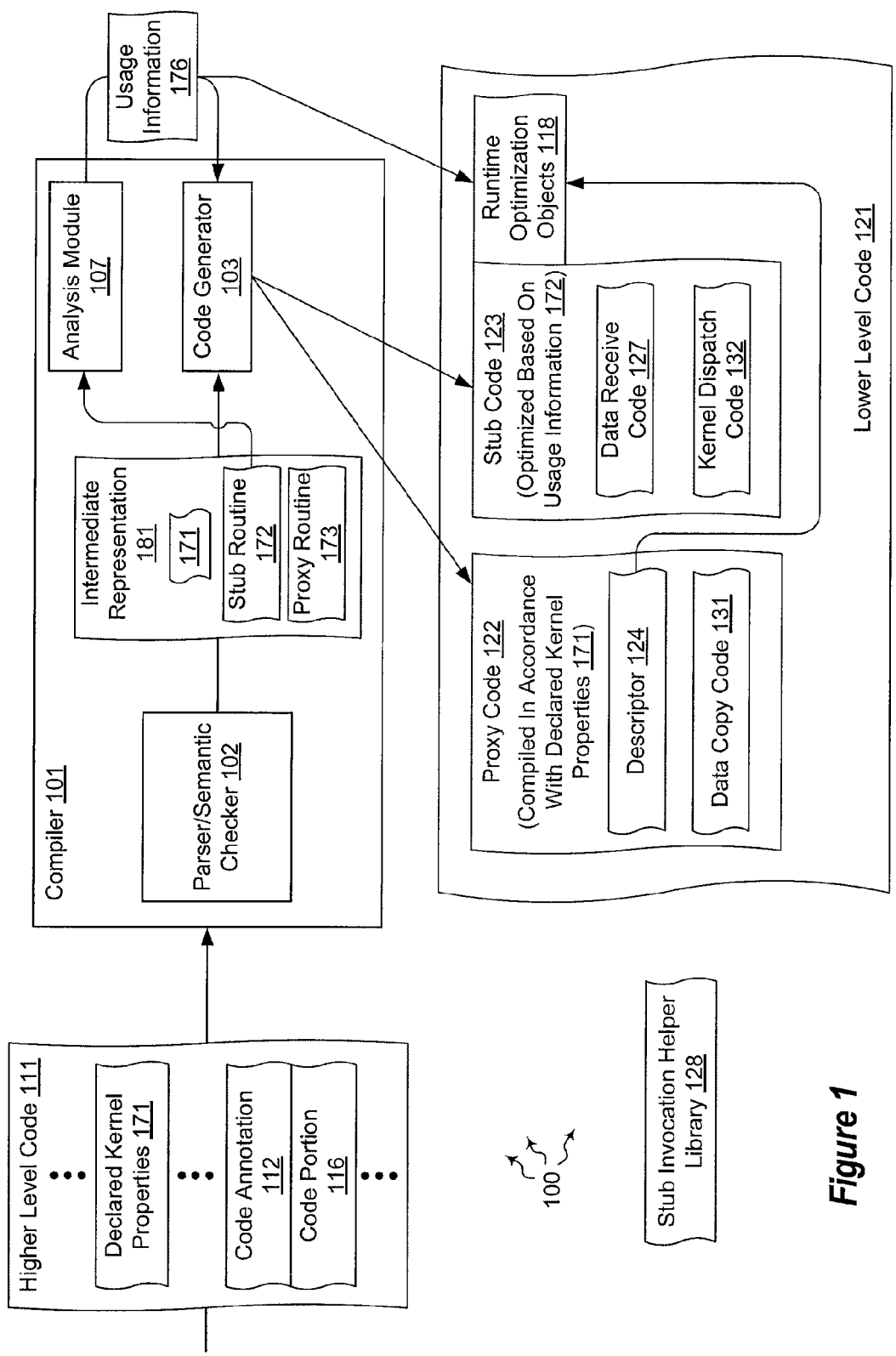
FIG. 1 illustrates an example computer architecture that facilitates generating lower level code so that kernel execution can be optimized at runtime.

The present invention extends to methods, systems, and computer program products for optimizing execution of kernels. In some embodiments, lower level code is generated so that kernel execution can be optimized at runtime. Program source code is accessed. The program source code includes an element that identifies part of the program source code as a kernel that is to be executed on a co-processor (e.g., a Graphical Processing Unit ("GPU") or other accelerator). The program source code also declares properties of the kernel.

The program source code is compiled into lower level code. The code element within the program source code is detected. In response to detecting the code element, the program source code is compiled into proxy code and into separate stub code. The proxy code is for execution in a context (e.g., on a central processing unit) that can invoke the stub code and the stub code is for execution on a co-processor.

Compilation of the source code includes generating the proxy code. The proxy code is configured to invoke the stub code in accordance with the declared properties of the kernel. The proxy code includes a descriptor for referencing any runtime optimization objects stored during compilation.

An intermediate representation of the stub code is analyzed to derive usage information about the declared properties of the kernel. The stub code is generated in accordance with the derived usage information. The derived usage information is stored in one or more runtime optimization objects alongside the stub code. The descriptor is linked to the one or more runtime optimization objects stored alongside the stub code to provide the proxy code with access to the derived usage information for making kernel optimization decisions at runtime.

In other embodiments, kernel execution is optimized at runtime. An execution command is received to execute lower level code. The lower level code includes proxy code for execution on a central processing unit, stub code for execution on co-processor, and one or more runtime optimization objects stored alongside the stub code. The one or more runtime optimization objects store derived usage information about the usage of kernel properties declared in program source code. The derived usage information was derived through analysis during generation of the stub code from program source code. The proxy code is configured to invoke the stub code in accordance with the declared kernel properties. The proxy code includes a descriptor linked to the one or more runtime optimization objects stored alongside the stub code.

In response to the execution command, the proxy code is executed on a central processing unit to invoke a call proxy. Execution of the proxy code includes using the descriptor to consult the derived usage information stored in the one or more runtime optimization objects. Execution of the proxy code includes making an optimization decision optimizing execution of the kernel based on the derived usage information. The optimization decision includes optimizing one or more of: invoking the stub code and passing data to the stub code. Execution of the proxy code includes invoking the stub code on a co-processor (e.g., a Graphical Processing Unit ("GPU") or other accelerator). Execution of the proxy code includes passing data to the stub code to dispatch the kernel on the co-processor.

The stub code is executed on the co-processor to invoke a call stub. Execution of the stub code includes receiving the data passed from the call proxy. Execution of the call stub includes dispatching the kernel on the co-processor in accordance with the formatted data.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including combinations having one or more of: personal computers, desktop computers, laptop computers, message processors, hand-held devices, multi-processor systems (including systems with a one or more Central Processing Units ("CPUs") and one or more co-processors, for example, Graphical Processing Units ("GPUs") or accelerators), microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention include an optimization framework for optimizing runtime execution of kernels. Information about the properties of a kernel is identified during compilation and stored alongside the executable code for the kernel. The information is made available to calling contexts at runtime. At runtime, calling contexts interpret the information and optimize kernel execution based on the interpretation.

There are a variety of applications for the optimization framework. One application includes, identifying at compile time and utilizing at runtime, memory immutability information about the immutability of memory resources consumed by a kernel. At runtime, memory immutability information can be used to evaluate the potential to run kernels concurrently and the potential to cache the memory resource contents without staleness.

Another application includes, identifying at compile time and utilizing at runtime, parameter reduction information for parameters passed to a kernel. A calling convention may require specified parameters to be passed to a kernel. However, the kernel may not actually consume all of the specified data. Parameter reduction information can identify portions of the specified data that are not used. At runtime, parameter reduction information can be used to relieve a calling context from passing parameters that would go unused at the kernel.

An additional application includes, identifying at compile time and utilizing at runtime, expected performance characteristics of a kernel. A runtime can use expected performance characteristics to select an appropriate co-processor for a kernel. For example, there may be multiple co-processors each with a different performance profile. At runtime, expected performance characteristics of a kernel can be used to assist in matching the kernel to a co-processor that can optimally execute the kernel.

A further application includes, identifying at compile time and utilizing at runtime, whether a kernel is to use mathematical libraries and/or advanced floating point operations. At runtime, information about the use of mathematical libraries and/or advanced floating point operations can be used to determine if auxiliary data (e.g., stored mathematical tables) is to be supplied to a kernel. At runtime, information about the use of mathematical libraries and/or advanced floating point operations can also be used to identify co-processors that are capable and/or best suited for the kernel.

FIG. 1 illustrates an example computer architecture that facilitates generating lower level code so that kernel execution can be optimized at runtime. Referring to FIG. 1, computer architecture 100 includes compiler 101. Compiler 101 is connected to other components (or is part of) of a system bus and/or a network, such as, for example, a Local Area Network ("LAN"), a Wide Area Network ("WAN"), and even the Internet. Accordingly, compiler 101 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the system bus and/or network.

Generally, complier 101 is configured to compile higher level code into lower level code.

As depicted, compiler 101 includes parser/semantic checker 102, code generator 103, and analyzer 107. Parser/semantic checker 102 is configured to receive statements and expressions of higher level code (e.g., written in C++, C++ extended for parallel environments, Visual Basic, etc.). Parser/semantic checker 102 can parse and semantically check statements and expressions of higher level code to identify different aspects/portions of the higher level code, including identifying different routines that are to be executed on different processors. Parser/semantic checker 102 can also identify compile time information (e.g., object formats, etc.) and/or runtime information (e.g., resource handles, object contents, a thread specification, for example, a number of threads, etc.) associated with different routines in the higher level code. Parser/semantic checker 102 can output an intermediate representation ("IR") of received source code.

In some embodiments, statements and expressions of higher level code include annotations and/or language extensions that are used to specify a section of program source code corresponding to a kernel. The kernel includes code that is to run on a co-processor. Parser/semantic checker 102 can identify transitions between "normal" execution on a "host" (i.e., execution on a CPU) and execution on a co-processor from these annotations and/or extensions. Parser/semantic checker 102 can represent kernel related code as a separate routine in IR.

Code generator 103 is configured to receive IR from parser/semantic checker 102. From the IR, code generator 103 can generate a plurality of different lower level instructions (e.g., DirectX®/High Level Shader Language ("HLSL") bytecode) that correctly implement the statements and expressions of received higher level code.

Analysis module 107 is configured to access IR generated by parser/semantic checker 102. Analysis module 107 can analyze the IR to identify interesting aspects of lower level kernel code (e.g., identifying optimization information that can be used at runtime to optimize kernel execution). Identified interesting aspects can be packed in objects and the objects stored alongside the lower level code. Accordingly, optimization information for optimizing kernel execution can be identified at compile time and stored along with the executable code for the kernel.

In some embodiments, stub code (and kernel) are outlined and represented as a separate routine in compiler 101's IR of a source code parse tree. Then, the stub code is lowered into an intermediate representation, which is machine independent. At a later stage, machine code appropriate for an accelerator (e.g., a GPU) is generated out of the stub function intermediate representation. Analysis of IR can occur at this alter stage, to glean interesting aspects of the stub code and make them available to the proxy code.

Figure 3:
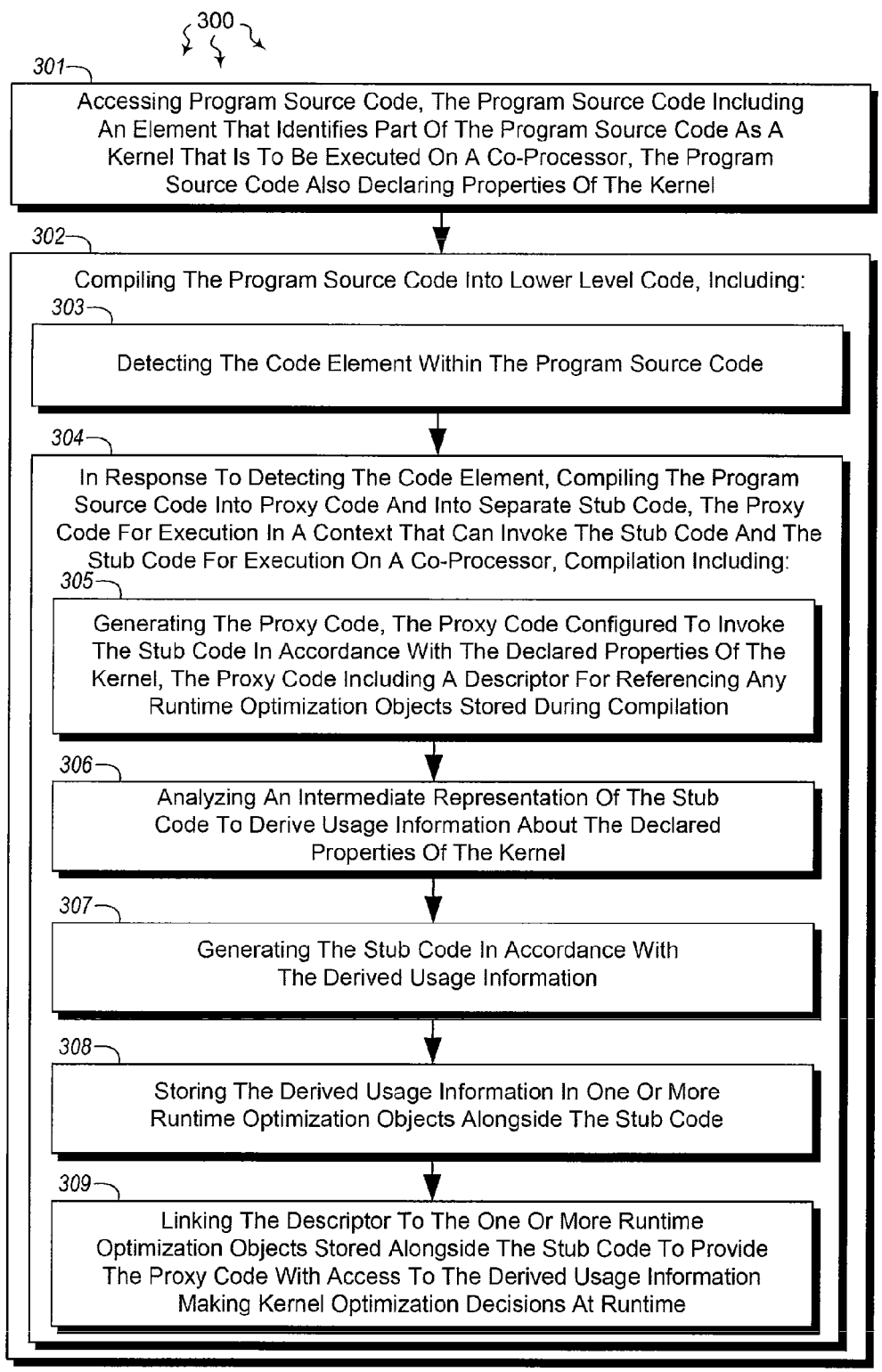
FIG. 3 illustrates a flow chart of an example method for optimizing lower level code during compilation of program source code used to generate the lower level code.

FIG. 3 illustrates a flow chart of an example method 300 for generating lower level code so that kernel execution can be optimized at runtime. Method 300 will be described with respect to the components and data depicted in computer architecture 100.

Method 300 includes an act of accessing program source code, the program source code including an element that identifies part of the program source code as a kernel that is to be executed on a co-processor, the program source code also declaring properties of the kernel (act 301). For example, compiler 101 can access higher level code 111. Higher level code 111 includes code annotation 112 identifying code portion 116 as a kernel for execution on a co-processor (e.g., a GPU or other accelerator). Higher level code 111 also includes declared kernel properties 171. Declared properties 171 can be used declared properties that a user declares are to be used for the kernel. Declared properties 171 can indicate read/write properties for memory resources to be used by the kernel, can define objects to be passed to the kernel, can define that the kernel is to use mathematical libraries, can define that the kernel is to use floating operations, etc.

Higher level code can also indicate a separation between normal code and co-processor code using any variety of other code elements, such a, for example, special functions or special statements. For example, in C++ a special function can be called to indicate separation of normal code and co-processor code.

Method 300 includes an act of compiling the program source code into lower level code (act 302). For example, compiler 101 can compiler higher level code 111 into lower level code 121 (e.g, HLSL byte code).

An act 302 includes an act of detecting the code element within the program source code (act 303). For example, parser/semantic checker 102 can detect code annotation 112 within higher level code 111. Parser/semantic checker 102 can create intermediate representation 181 form higher level code 111. Parser/semantic checker 102 can split kernel related code into stub routine 172 and calling context code into proxy routine 173 in accordance with code annotation 112 (i.e., code annotation 112 demarks the boundary between kernel code and other code).

Act 302 can include in response to detecting the code element, compiling the program source code into proxy code and into separate stub code, the proxy code for execution in a context (e.g., on a central processing unit) that can invoke the stub code and the stub code for execution on a co-processor (act 304). For example, in response to detecting code annotation 112, compiler 101 can compile higher level code 111 into proxy code 122 for execution on a CPU and stub code 123 for execution on a co-processor.

Act 304 includes an act of generating the proxy code, the proxy code configured to invoke the stub code in accordance with the declared properties of the kernel, the proxy code including a descriptor for referencing any runtime optimization objects stored during compilation (act 305). For example, code generator 103 can generate proxy code 122. Proxy code 122 is configured to invoke stub code 123 in accordance with declared properties 171. Proxy code 122 includes descriptor 124 for referencing any runtime optimizations stored during compilation of higher level code 111.

Proxy code 122 also includes data copy code 131. Proxy code 122 is configured to use descriptor 124 to access kernel usage information, such as, for example, usage information 176. Proxy code 122 is also configured to access co-processor characteristics for any co-processors available for kernel execution.

Stub invocation helper library 128 is a fixed helper library. Stub invocation helper library 128 is configured to receive usage data (e.g., contained in optimization objects), device (e.g., co-processor) characteristics, and input data (buffers and parameters). Based on these inputs, stub invocation helper library 128 can (a) select the appropriate device (e.g., co-processor), (b) package the data for the selected device, and (c) dispatch a call to the device. Stub code 122 can collect these data (e.g., optimization objects and buffer and parameters data) and pass them in generic form to the stub invocation helper library 128.

Data copy code 131 is configured to execute as data copy code in a runtime. At runtime, the data copy code copies data to the co-processor were the data is available to for stub code to consume, based on kernel optimization decisions.

Act 304 includes an act of analyzing an intermediate representation of the stub code to derive usage information about the declared properties of the kernel (act 306). For example, analysis module 107 can analyze stub routine 172 to derive usage information 176 about declared properties 171. Usage information 176 can include an indication that declared properties 171 are used to a lesser extent than declared. For example, declared properties 171 can declare a specified memory resource for a kernel as read/write. However, analysis module 107 can determine that data is only read from the specified memory resource. Usage information 176 can reflect that the specified memory resource is only read from. Alternately, analysis module 107 can determine that the kernel completely overwrites memory resource and never reads from it. Usage information 176 can reflect that the specified memory resource is overwritten and not read from.

Declared properties 171 can also declare objects that are to be passed to a kernel. Analysis module 107 can determine that less than all of the declared objects are actually used by the kernel. Usage information 176 can reflect that less than all of the declared objects are used by the kernel.

Declared properties 171 can also declare that a kernel is to use mathematical libraries and/or floating pointer operations. Analysis module 107 can determine that mathematical libraries and/or floating pointer operations are actually used by the kernel. Usage information 176 can reflect that mathematical libraries and/or floating pointer operations are actually used by the kernel.

Analysis module 107 can also characterize performance aspects of a kernel, such as, for example, making an assertion whether the kernel is compute-bound or memory-bound. Usage information 176 can reflect characterized performance aspects of a kernel.

Act 304 includes an act of generating the stub code in accordance with the derived usage information (act 307). For example, code generator 103 can generate stub code 123 in accordance with usage information 176. Generating stub code in accordance with usage information 176 can include optimizing stub code 123 or altering stub code 123 for optimization based on usage information 176. For example, declared properties 171 may indicate that stub code 123 is to receive three variables. However, usage information 176 may indicate that one of the three variables goes unused. Accordingly, code generator 103 optimizes stub code 123 by removing code for receiving the unused variable.

Similarly, declared properties 171 may indicate a memory resource as read and write. However, usage information 176 may indicate that no values are ever written to the memory resource (e.g., after initialization to a specified value). Accordingly, code generator 103 can alter stub code 123 by defining the memory resource as read only. Defining the memory resource as read only can facilitate optimizations at runtime.

Likewise, declared properties 171 may indicate that stub code 123 uses a mathematical library. However, usage information 176 may indicate that the mathematical library is not actually used. Accordingly, code generator 103 optimizes stub code 123 to remove reference to auxiliary data used by the mathematical library.

As depicted, stub code 123 includes data receive code 127 and kernel dispatch code 132. Data receive code 127 is configured to execute as data receive code in a runtime. At runtime, the data receive code receives data from a call proxy. Kernel dispatch code 132 is configured to execute as kernel dispatch code in a runtime. At runtime, the kernel dispatch code dispatches a kernel to perform work on the kernel formatted data.

Act 304 includes an act of storing the derived usage information in one or more runtime optimization objects alongside the stub code (act 308). For example, analysis module 107 can store usage information 176 in runtime optimization objects 118 alongside stub code 123. Act 304 includes an act of linking the descriptor to the one or more runtime optimization objects stored alongside the stub code to provide the proxy code with access to the derived usage information for making kernel optimization decisions at runtime (act 309). For example, descriptor 124 can be linked to runtime optimization objects 118 to provide proxy code 123 with access to usage information 176 at runtime. Thus, although proxy code 122 was not compiled based on usage information 176, proxy code 122 can still access and utilize usage information 176 at runtime to facilitate appropriate interface with and optimizations of a kernel.

Figure 2:
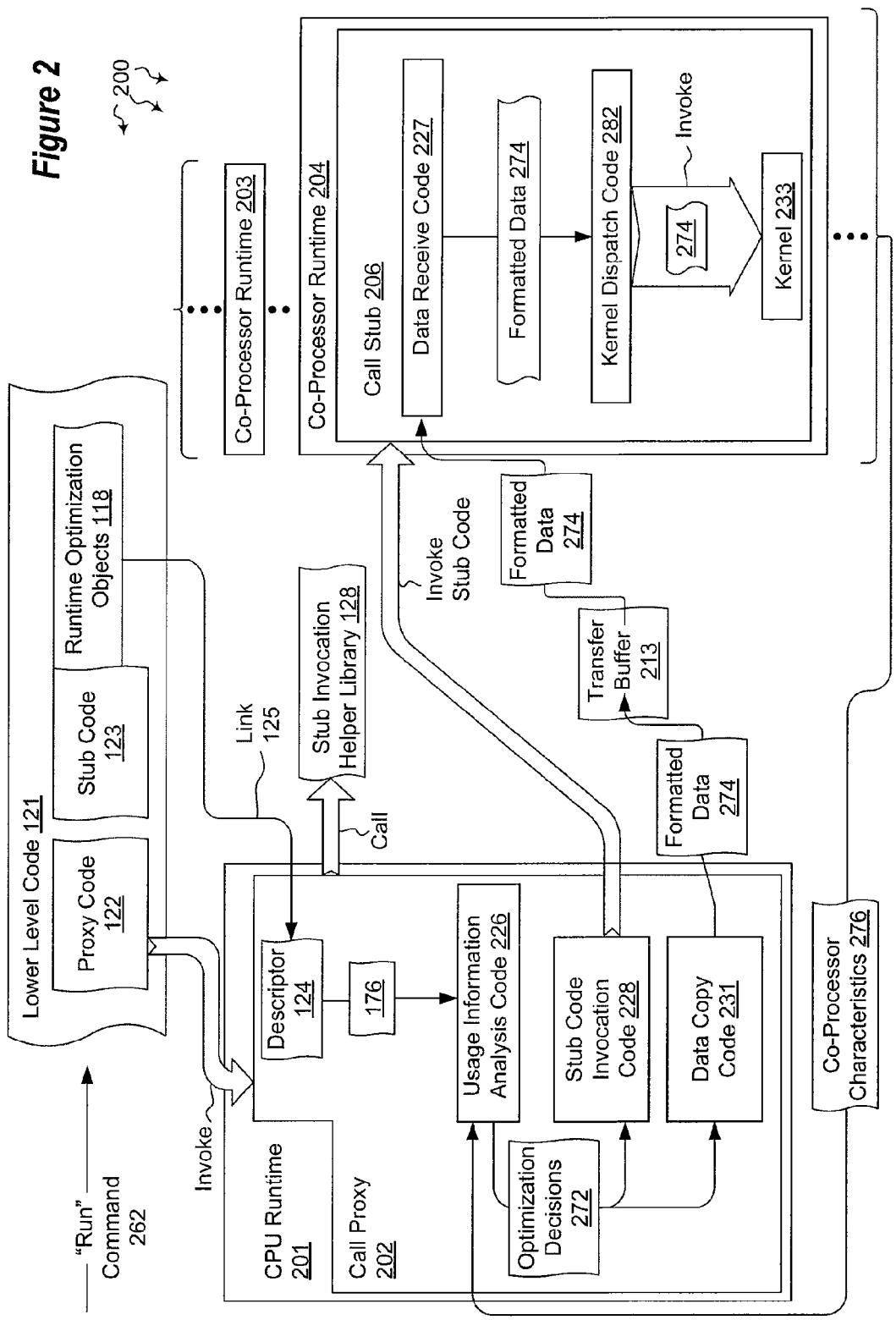
FIG. 2 illustrates an example computer architecture that facilitates optimizing kernel execution at runtime.

FIG. 2 illustrates an example computer architecture 200 that facilitates optimizing kernel execution at runtime. Referring to FIG. 2, computer architecture 200 includes CPU runtime 201, co-processor runtime 203, and co-processor runtime 204. CPU runtime 201, co-processor runtime 203, and co-processor runtime 204 can be connected one another and to other components over (or be part of) of a system bus and/or a network, such as, for example, a Local Area Network ("LAN"), a Wide Area Network ("WAN"), and even the Internet. Accordingly, CPU runtime 201, co-processor runtime 203, and co-processor runtime 204 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the system bus and/or network.

Figure 4:
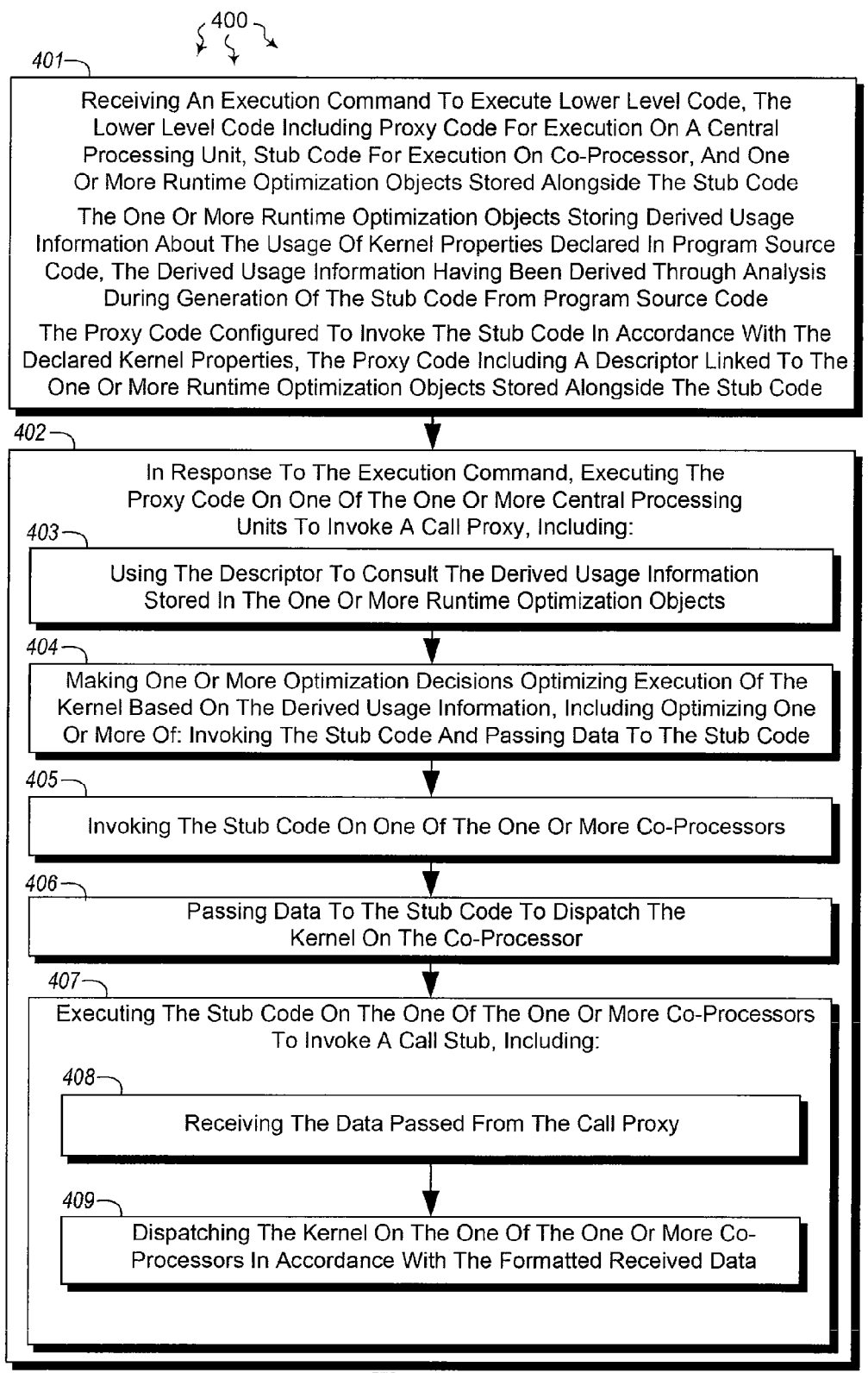
FIG. 4 illustrates a flow chart of an example method for optimizing execution of a kernel on a co-processor.

FIG. 4 illustrates a flow chart of an example method 400 for optimizing kernel execution at runtime. Method 400 will be described with respect to the components and data depicted in computer architecture 200.

Method 400 includes an act of receiving an execution command to execute lower level code, the lower level code including proxy code for execution on a central processing unit, stub code for execution on co-processor, and one or more runtime optimization objects stored alongside the stub code (act 401). For example, computer architecture 200 can receive run command 262 to execute lower level code 121. During compilation of lower level code 121 proxy code 122 was generated for execution on a CPU and stub code was generated for execution on a co-processor (e.g., a GPU or other accelerator). Runtime optimization objects 118 are stored alongside stub code 123. As described, runtime optimization objects 118 store usage information 176 previously derived by analysis module 107. Also as described, proxy code 122 is configured to invoke stub code 123 in accordance with declared kernel properties 171.

Method 400 includes in response to the execution command, an act of executing the proxy code on one of one or more central processing units to invoke a call stub (act 402). For example, proxy code 122 can be executed within CPU runtime 201 to invoke call proxy 202. Data copy code 231 can be instantiated within call proxy 202.

Act 402 includes an act of using the descriptor to consult the derived usage information stored in the one or more runtime optimization objects (act 403). For example, call proxy 222 can use descriptor 124 to link 125 to usage information 176 stored in runtime optimization objects 118. Call proxy 202 can also access co-processor characteristics 276. Co-processor characteristics 276 indicate the execution characteristics, such as, for example, compute capabilities, memory interface capabilities, floating point capabilities, etc. of co-processor runtimes 203, 204, etc. Call proxy 202 can also call stub invocation helper library 128 to execute usage information analysis code 226 and stub code invocation code 228. Call proxy 202 can pass usage information 176 and co-processor characteristics 276 to usage information analysis code 226.

Act 402 includes an act of making one or more optimization decisions optimizing execution of the kernel based on the derived usage information, including optimizing one or more of: invoking the stub code and passing data to the stub code (act 404). For example, usage information analysis code 226 can make optimization decisions 272 for optimizing execution of a kernel based on usage information 176. Usage information analysis code 226 can also base optimization decisions on co-processor characteristics 276 or on a combination of usage information 176 and co-processor characteristics 276. Optimization decisions 272 can be passed to stub code invocation code 228 and data copy code 231.

An optimization decision can include sending less than all data that is otherwise indicated by declared properties 171. For example, it may be that declared properties 171 indicate that a kernel is to receive four objects as input. However, analysis module 107 can determine that two of the objects are not actually used by the kernel. Thus, usage information analysis code 226 can make an optimization decision to refrain from sending the two declared but unused objects to the kernel.

Similarly, it may be that declared properties 171 indicate that a kernel is to use mathematical libraries. Analysis module 107 can verify that the mathematical libraries are actually used by the kernel. Thus, usage information analysis code 226 can dictate that auxiliary information for the mathematical libraries be supplied to the kernel.

Further it may be that declared properties 171 indicate that data is both read from and written to a memory resource. However, analysis module 107 can determine that data is never actually written to the memory resource (e.g., the memory resource retains initialized data). Thus, usage information analysis code 226 can make an optimization decision to run multiple kernels concurrently for multiple kernels that just read the memory resource. Alternately, analysis module 107 can determine that a kernel completely overwrites the memory resources but the memory resource is never read form. Thus, usage information analysis code 226 can make an optimization decision not to initialize the memory resource prior to sending the memory resource to stub code.

Analysis module 107 can determine that a kernel has various performance aspects, such as, for example, that a kernel is compute-bound, that a kernel is memory-bound, that a kernel uses integer math, that a kernel uses floating point math, that a kernel has divergent control flow paths, that a kernel uses a memory access pattern (e.g., streaming or temporal locality), etc. Usage information analysis code 226 can make an optimization decision to invoke a kernel on an available co-processor that is appropriately suited to execute the kernel based on the kernel's determined performance aspects.

Thus, although proxy code 122 is not compiled to address and/or interface with optimizations that were compiled stub code 123 at compile time, at runtime call proxy 202 adjusts to address these stub code optimizations through reference to stored usage information 176.

Act 402 includes an act of invoking the stub code on one of the one or more co-processors (act 405). For example, stub code invocation code 228 can invoke stub code 123 within co-processor runtime 204 to create call stub 206. Co-processor runtime 204 can be selected due to availability and/or can be selected for suitability based on optimization decisions 272. For example, stub code invocation code 228 can invoke stub code 206 on co-processor runtime 204 based on optimization decisions 272. Co-processor runtime 204 may have increased suitability over other co-processor runtimes due to compute capabilities, memory interface capabilities, floating point math capabilities, etc.

Act 402 includes an act of passing data to the stub code to dispatch the kernel on the co-processor (act 406). For example, data copy code 231 can copy formatted data 274 to transfer buffer 213. Data copy code 231 can copy formatted data 274 in accordance with optimization decisions 272. For example, data copy code 231 can send less than all data that is otherwise indicated by declared properties 171.

Method 400 includes an act of executing the stub code on the one of the one or more co-processors to invoke a call stub (act 407). For example, stub code 123 can be executed on co-processor runtime 204 to invoke call stub 206. Act 407 includes an act of receiving the data passed from the call proxy (act 408). For example, data receive code 227 can receive formatted data 274 from transfer buffer 213. Act 407 includes an act of dispatching the kernel on the one of the one or more co-processors in accordance with the formatted data (act 409). For example, kernel dispatch code 282 can invoke kernel 233 on co-processor runtime 204 in accordance with formatted data 274.

Embodiments of the invention include using optional optimizations as well as required optimizations. Required optimizations are optimizations that, if not implemented, impact the correctness of kernel execution. For example, declarations for a kernel may indicate that three variables are passed to the kernel. However, compile time analysis can determine that one of the variables is not used. As such, generated stub code is configured to receive the two used variables. If a corresponding call proxy is not optimized to just pass the two variables, and instead passes all three declared variables, an error can occur.

Optional optimizations are optimizations that, if not implemented, can result in reduced kernel performance but still maintain correctness of kernel execution. For example, compile time analysis can reveal that a kernel uses significant floating point math. As such, invoking the kernel on a co-processor with increased floating point capabilities can optimize performance. However, while invoking the kernel on a co-processor with reduced floating point capabilities might result in slower execution, the kernel still operates correctly. In general, optimizations related to the suitability of a specified co-processor for a specified kernel can be viewed as optional.

As described, annotations, or language extensions, can used to specify which section of program source code corresponds to a kernel. The code surrounding the kernel takes care of dispatching the kernel on the device. For example, in C++ extended for parallel environments an extension can have the following format:

Forall(<compute_domain>, <kernel>);.

The kernel specifies the code to run on the accelerator while the "forall" statement provides the transition point between normal execution on the "host" (e.g., a CPU) to accelerated execution on the accelerator (e.g., a GPU).

In some embodiments, it is determined whether a memory resource is ever written to, or is conversely just read from. As part of translation of IR to stub code (e.g., stub code 123), a compiler (e.g., compiler 101) may recursively inline all functions called by the stub and in addition also perform pointer disambiguation. Accordingly, it is increasingly possible to assert that a certain memory resource is only accessed for reading. For example, when C++ extended for parallel environments is lowered into DirectX®/HLSL byte code, memory resource accesses are translated into accesses into a fixed set (per kernel) of named memory resources. Thus, to figure out whether a certain named resource in this set is accessed in a particular mode (read or write), code paths in the kernel are simulated using abstract interpretation or dataflow techniques, until it is revealed whether any live write-sites exist in the kernel. If all write-sites into a memory resource have been eliminated (or if none existed to begin with), then the compiler can assert that the memory resource is immutable (e.g., in usage information 176).

A call proxy (e.g., call proxy 202) can utilize the assertions about memory resources accessed by the kernel and adjust the bindings of resources to kernels, based on the summaries of access mode made available by the kernel compilation process. For example, the call proxy (e.g., call proxy 202) can use the assertions at runtime to make optimization decisions, such as, for example, related to running kernels concurrently, caching contents of the memory resource without worrying about them becoming stale, or choosing not to initialize a memory resource.

In other embodiments, it may be that a call site of the kernel passes all objects which are required by the kernel's signature, without knowledge of which particular subset of these objects the kernel is ever going to access. For example, it is possible that a kernel would state that it needs to receive some three dimensional coordinate values, yet only access the X and Y coordinates, but not the Z coordinate.

Through compile time analysis, it is possible for a compiler (e.g., compiler 101) to assert that some pieces of parameter information are not actually needed. For example, for an array of integers, the compiler can assert that a subset of the slots in the array is not required. The compiler can create a map to summarize the non-use of the slots. The map maps from the original (declared) layout of the integer array (which has N elements) to another integer array (which has M<N elements). For each index in the range [0 . . . M-1] the mapping assigns a source index in the range [0 . . . N-1]. The mapping describes how to create the compressed parameters array (with M elements) from the original array with N elements. The map can be stored in usage information (e.g., usage information 176).

Proxy code (e.g., proxy code 202) uses the map at runtime. The proxy code is compiled to assemble a source array with N elements (i.e., as declared), since at proxy code compile time, the value of M is not known and the details of the mapping between the source and compressed arrays are not known. However, the proxy code does expect to act on a runtime-provided mapping (e.g., in runtime optimization objects 118) where the value of M will be specified, alongside the map. At runtime, a call proxy (e.g., call proxy 202) receives the N-element array. Referring the value of M and the mapping, the call proxy creates a compressed M-element array, which it passes to the call stub (e.g., call stub 206). The compiled call stub and kernel (e.g., kernel 233) were compiled based on the assertion and are ready to receive a compressed M-element array.

In further embodiments, a compiler (e.g., compiler 101) characterizes kernel performance from IR and stores the characterization in usage information (e.g., usage information 176). Accordingly, a call proxy (e.g., call proxy 202) can use the characterization at runtime to make a decision about which co-processor (e.g., GPU or other accelerator) is best suited to execute the kernel. Kernels are sometimes compute-bound while other kernels are memory-bound. Similarly some co-processors provide more compute capabilities, while others provide a more capable memory interface.

The compiler can model the performance characteristic of a kernel at compile time, making predications on whether the kernel is compute-bound or memory-bound. Then, this information is available at runtime, when the kernel is dispatched. The runtime can take the asserted characteristics into account when choosing which device to launch the kernel on, preferring the assignment of compute-capable accelerators to compute-bound kernels etc. Similarly, other interesting performance aspects about the kernel include whether it uses more integer math than floating point math, or vice versa, and whether it contains divergent control flow paths.

In additional embodiments, a compiler (e.g., compiler 101) detects whether a kernel makes use of mathematical libraries or advanced floating point operations. The compiler stores these detections in usage information (e.g., usage information 176). Based on this information, a call proxy (e.g., call proxy 202) can (a) know whether it needs to supply the kernel with auxiliary information, such a mathematical tables stored in memory resources and (b) decide which accelerator is capable and is best suited for executing such a kernel.

Usage information (e.g., usage information 176) collected by a compiler (e.g. compiler 101) can be packaged into a binary structure (e.g., runtime optimization objects 181) which is then bound to stub code (e.g. stub code 123). Accordingly, the usage information is efficiently accessible at runtime and in a predictable manner whenever a kernel is dispatched. Usage information can be stored in an extensible format. The extensible format supports communication of additional asserted information from a compiler to a runtime. The format is backwards compatible such that a compiler and runtime can be serviced separately. One example extensible format is:

```
struct {
    uint NumApplications;
    struct {
        uint ApplicationID;
        uint Offset;
    } Index[NumApplictions];
} APPLICATIONS_INDEX;
```

Different types of compile time derived usage information are each assigned to a unique identifier. In a binary representation, each types of compile time derived usage information may require a different amount of space, so an offset where the information about each application is stored accompanies the application ID. The ID format for one combination of different types of compile time derived usage information is as follows:

```
const uint ImmutabilityApplication = 1;
struct {
    uint NumMemoryResources;
    bool IsImmutable[NumMemoryResources];
} IMMUTABILITY_INFORMATION;
const int ParameterCompressionApplication = 2;
struct {
    uint NumCompressedParameterWords;
    uint Mapping[NumCompressedParameterWords];
} PARAMETER_COMPRESSION_INFORMATION;
const int PerformanceApplication = 3;
struct {
    bool IsMemoryBound;
    bool IsUsingFloatingPoint;
    bool IsUsingIntegers;
};
const int MathLibraryApplication = 4;
struct {
    uint NumberOfRequiredMathTables;
    uint MathTablesIDs[NumberOfRequiredMathTables];
};
```

Thus, generally, embodiments of the invention summarize use information gleaned by the compiler about stub code. Corresponding proxy code can take advantage of the use information at runtime, without the compilation of the proxy code taking a dependency on the compilation process for the stub code. Thus, embodiments can provide information from the stub code to the proxy code (bottoms-up information) in a reliable fashion without requiring full program analysis. The information is reliable at least in that it is furnished from the stub code to the proxy code at runtime.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a compiler for generating lower level code from a program source code, a method for generating lower level code so that kernel execution can be optimized at runtime, the method comprising:
    an act of accessing program source code, the program source code including an annotation that identifies part of the program source code as a kernel that is to be executed on a co-processor, the program source code also declaring properties of the kernel;
    an act of compiling the program source code into lower level code, including:
        an act of detecting the code annotation within the program source code;
        in response to detecting a code annotation, compiling the program source code into proxy code and into separate stub code, the proxy code for execution on a central processing unit and the stub code for execution on a co-processor, compilation including:
            an act of generating the proxy code, the proxy code configured to invoke the stub code in accordance with the declared properties of the kernel, the proxy code including a descriptor for referencing any runtime optimization objects stored during compilation;
            an act of analyzing an intermediate representation of the stub code to derive usage information about the declared properties of the kernel;
            an act of generating the stub code in accordance with the derived usage information;
            an act of storing the derived usage information in one or more runtime optimization objects alongside the stub code; and
            an act of linking the descriptor to the one or more runtime optimization objects stored alongside the stub code to provide the proxy code with access to the derived usage information for making kernel optimization decisions at runtime.

2. The method as recited in claim 1, wherein the act of generating the stub code comprising an act of generating the stub code based on the derived usage information so as to optimize execution of the stub code at runtime.

3. The method as recited in claim 1, wherein the act of analyzing an intermediate representation of the stub code to derive usage information about the declared properties of the kernel comprises an act of deriving usage information indicative of a compulsory kernel optimization the proxy code is to implement for correctness.

4. The method as recited in claim 1, wherein the act of analyzing an intermediate representation of the stub code to derive usage information about the declared properties of the kernel comprises an act of deriving usage information indicative of an optional kernel optimization the proxy code can implement when appropriate.

5. The method as recited in claim 1, wherein the act of analyzing an intermediate representation of the stub code to derive usage information about the declared properties of the kernel comprises an act of deriving usage information indicating that a subset of the declared kernel properties are actually used by the kernel.

6. The method as recited in claim 5, wherein the act of deriving usage information indicating that a subset of the declared kernel properties are actually used by the kernel comprises an act of deriving usage information that indicates one or more of the following: that a declared piece of parameter information for the stub code is not actually used in the stub code, that a declared type of memory access for a memory resource in the stub code is not actually used in the stub code, that a declared mathematical library for the stub code is actually used in the stub code, and that a declared floating point operation for the stub code is actually used in the stub code.

7. The method as recited in claim 5, wherein the act of linking the descriptor to the one or more runtime optimization objects stored alongside the stub code to provide the proxy code with access to the derived usage information for making kernel optimization decisions at runtime comprises an act of linking the descriptor to the derived usage information that indicates that a subset of the declared kernel properties are actually used so that the proxy code can invoke the stub code using the subset of the declared kernel properties 8. The method as recited in claim 1, wherein the act of analyzing the stub code during generation of the stub code to derive usage information about the declared properties of the kernel comprises an act of deriving usage information indicating that the kernel is one of: compute-bound or memory-bound.

9. The method as recited in claim 1, further comprising:
    an act of analyzing the stub code to set a data layout for passing data between the proxy code and the stub code;
    an act of optimizing the stub code to use the data layout; and
    an act of storing the data layout in the one or more runtime optimization objects; and
    wherein the act of linking the descriptor to the one or more runtime optimization objects stored alongside the stub code comprises an act of providing the proxy code with access to the data layout for use at runtime.

10. At a computer system, the computer system including one or more central processing units and one or more co-processors, a method for optimizing kernel execution at runtime, the method comprising:
    an act of receiving an execution command to execute lower level code, the lower level code including proxy code for execution on a central processing unit, stub code for execution on a co-processor, and one or more runtime optimization objects stored alongside the stub code,
        the one or more runtime optimization objects storing derived usage information about the usage of kernel properties declared in program source code, the derived usage information having been derived through analysis during generation of the stub code from program source code;
        the proxy code configured to invoke the stub code in accordance with the declared kernel properties, the proxy code including a descriptor linked to the one or more runtime optimization objects stored alongside the stub code;

in response to the execution command, an act of executing the proxy code on one of the one or more central processing units to invoke a call proxy, including:
an act of using the descriptor to consult the derived usage information stored in the one or more runtime optimization objects;
an act of making one or more optimization decisions optimizing execution of the kernel based on the derived usage information, including optimizing one or more of: invoking the stub code and passing data to the stub code;
an act of invoking the stub code on one of the one or more coprocessors; and
an act of passing data to the stub code to dispatch the kernel on the co-processor.

11. The method as recite din claim 10, further comprising:
an act of executing the stub code on the one of the one or more co-processors to invoke a call stub, including:
an act of receiving the data passed from the call proxy; and
an act of dispatching the kernel on the one of the one or more co-processors in accordance with the received data.

12. The method as recited in claim 10, wherein the one or more runtime optimization objects also store a data layout for passing data between the proxy code and the stub code;
wherein the stub code was optimized at compile time to use the data layout; and
wherein the act of passing data to the call stub to dispatch the kernel on the co-processor comprises an act of passing data using the data layout.

13. The method as recited in claim 10, wherein the act of using the descriptor to consult the derived usage information stored in the one or more runtime optimization objects comprises an act of consulting derived usage information that indicates a subset of the declared kernel properties are actually used by the kernel.

14. The method as recited in claim 13, wherein the act of consulting derived usage information that indicates a subset of the declared kernel properties are actually used by the kernel comprises an act of consulting derived usage information that indicates one or more of the following: that a declared piece of parameter information for the stub code is not actually used in the stub code, that a declared type of memory access for a memory resource in the stub code is not actually used in the stub code, that a declared mathematical library for the stub code is not actually used in the stub code, and that a declared floating point operation for the stub code is not actually used in the stub code.

15. The method as recited in claim 11, wherein the act of making one or more optimization decisions optimizing execution of the kernel comprises an act of selecting a co-processor, from among the one or more co-processors, that is appropriately suited for executing the kernel based on the characteristics of the selected co-processor in view of the derived usage information.

16. The method as recited in claim 11, wherein the act of making one or more optimization decisions optimizing execution of the kernel comprises an act of invoking multiple kernels concurrently based on the derived usage information indicating that a memory resource declared as read/write is not written to.

17. The method as recited in claim 11, wherein the act of making one or more optimization decisions optimizing execution of the kernel comprises an act of choosing not to initialize a memory resource prior to sending the memory resource to the call stub due to the memory resource being completely overwritten and not read from.

18. The method as recited in claim 11, wherein the act of making one or more optimization decisions optimizing execution of the kernel comprises an act of passing less than all of the declared parameters for the kernel based on the derived usage information indicating that at least one declared parameter is not actually used by the kernel.

19. The method as recited in claim 11, the act of making one or more optimization decisions optimizing execution of the kernel comprises an act of refraining from passing mathematical tables to the call stub based on the derived usage information indicating that a declared mathematical library is not actually used by the kernel.

20. At a computer system, the computer system including one or more central processing units and one or more co-processors, a method for optimizing kernel execution at runtime, the method comprising:
an act of receiving an execution command to execute lower level code, the lower level code including proxy code for execution on a central processing unit, High Level Shader Language ("HLSL") byte code for execution on a co-processor, and one or more runtime optimization objects bound to the HLSL byte code,
the one or more runtime optimization objects storing derived usage information about the usage of kernel properties declared in C++source code, the derived usage information having been derived through analysis during generation of the HLSL byte code from the C++source code;
the proxy code configured to invoke the HLSL byte code in accordance with the declared kernel properties, the proxy code including a descriptor linked to the one or more runtime optimization objects bound to the HLSL byte code;
in response to the execution command, an act of executing the proxy code on one of the one or more central processing units to invoke a call proxy, including:
an act of using the descriptor to consult the derived usage information stored in the one or more runtime optimization objects;
an act of making an optimization decision optimizing execution of the kernel based on the derived usage information, including optimizing one or more of:
invoking the HLSL byte code and passing data to the HLSL byte code;
an act of invoking the HLSL byte code on one of the one or more co-processors; and
an act of passing data to the HLSL byte code to dispatch the kernel on the co-processor;
an act of executing the HLSL byte code on the one of the one or more co-processors to invoke a call stub, including:
an act of receiving the data passed from the call proxy; and
an act of dispatching the kernel on the one of the one or more co-processors in accordance with the received data.

* * * * *